United States Patent [19]

Wakamatsu et al.

[11] Patent Number: 4,552,449

[45] Date of Patent: Nov. 12, 1985

[54] COMPOUND IMAGE RECORDING APPARATUS

[75] Inventors: Kazuhiro Wakamatsu; Yoshio Kawamata, both of Hitachi, Japan

[73] Assignee: Hitachi, Ltd., Tokyo, Japan

[21] Appl. No.: 544,139

[22] Filed: Oct. 21, 1983

[30] Foreign Application Priority Data

Oct. 22, 1982 [JP] Japan ................................ 57-184468

[51] Int. Cl.$^4$ ........................................... G03G 15/00
[52] U.S. Cl. ...................................... 355/3 R; 355/7; 355/14 R
[58] Field of Search .............. 355/3 R, 7, 14 R, 14 E, 355/71; 346/153.1, 160; 358/300

[56] References Cited

U.S. PATENT DOCUMENTS

| | | | |
|---|---|---|---|
| 3,936,172 | 3/1976 | McVeigh | 355/7 X |
| 4,340,295 | 7/1982 | Nakamura | 355/14 R |
| 4,378,156 | 3/1983 | Yajima et al. | 355/7 X |

Primary Examiner—A. T. Grimley
Assistant Examiner—J. Pendegrass
Attorney, Agent, or Firm—Antonelli, Terry & Wands

[57] ABSTRACT

An electrophotographic printer for producing a print of compound copied image and printed character image on a printing medium. The printer has a copying exposure system for forming the first electrostatic latent image on the printing medium on a drum by the exposure of the medium to an image in a certain area of a copy text through an electrically controlled optical switch, and a printing exposure system for forming the second electrostatic latent image by the exposure of the printing medium to a scanning laser beam which is modulated by a laser beam generator in accordance with literal information to be printed. In order that the first and second latent images do not interfere with each other, a main sequence controller provides positional sync signals when the drum has specified positional relations with both exposure systems, information on the positional relations between the exposure systems and the drum is produced from the signal, and a composing sequence controller controls the optical switch and laser beam scanner in accordance with the positional information and information on composing positions stored in a frame composition buffer storing frame composing information.

11 Claims, 11 Drawing Figures

COMPOUND IMAGE RECORDING APPARATUS

The present invention relates to a printer using electrophotographic technology and, particularly, to an electrophotographic printer having copying and character printing functions for producing a print of compound copied and printed character images.

There is known a printer using electrophotographic technology, in which the first electrostatic latent image is formed by the copying exposure to the reflection or transmission light from the original text image, the second electrostatic latent image is formed by the printing exposure to the laser beam, and then the first and second electrostatic latent images are subjected to positive development and a compound toner image reflecting the first and second latent images is produced on a printing medium such as a sheet of paper. In a printer of this type, the original image is generally given as a positive image (e.g., black information on the white background). If the electrophotographic-photosensitive medium is exposed by such a positive image to form the first electrostatic latent image, charges in portions of blank areas of the text are lost, and therefore, the second electrostatic latent image cannot be formed by the printing exposure to the laser beam.

In order to overcome such a failing, there is known a method in which areas of the text corresponding to portions where the second electrostatic latent image will be formed are blackened in advance so that charges will remain after the photosensitive medium is exposed for copying, and thereafter the charged portions are subjected to printing exposure by the laser beam to form the second electrostatic latent image. This method has advantages of producing a print of compound copied and printed character images, as well as providing a print of sole copied image or sole printed character image, but on the other hand has a shortcoming that the text must have been blackened for portions to be printed in order to obtain a print of compound images.

An alternative method is known, in which a negative subsidiary text is produced from a positive text to be copied, the first negative electrostatic latent image is formed based on the subsidiary text through the copying exposure for the photosensitive medium, residual areas left by the copying exposure are subjected to printing exposure by the laser beam to form a second negative electrostatic latent image, and then both electrostatic latent images are subjected to reversal development process to obtain a print of positive compound images. This method is advantageous in eliminating the blackening process for the text, but has a shortcoming that a negative subsidiary text must be made in advance for producing a print of compound images or a copy of usual positive text.

Accordingly, it is an object of the present invention to overcome the foregoing prior art deficiencies and provide an electrophotographic printer useful to produce a print of compound copied and printed character images as well as a print of sole copied or sole printed character image.

In order to achieve the above object, the exposure systems for the photosensitive recording medium, according to the present invention, include a copying exposure system which performs exposure based on the image of a copying text placed on the text table through an electrically controlled optical switch, and a printing exposure system which performs exposure using a laser beam controlled by print image information, so that the optical switch is controlled based on frame composing information on two images to be exposed by both exposure systems and information on the positional relations between the exposure systems and the recording medium, whereby areas to be exposed to the laser beam are not subjected to copying exposure.

The present invention will be apparent from the following detailed description taken in conjunction with the accompanying drawings, in which.

Figure 1:
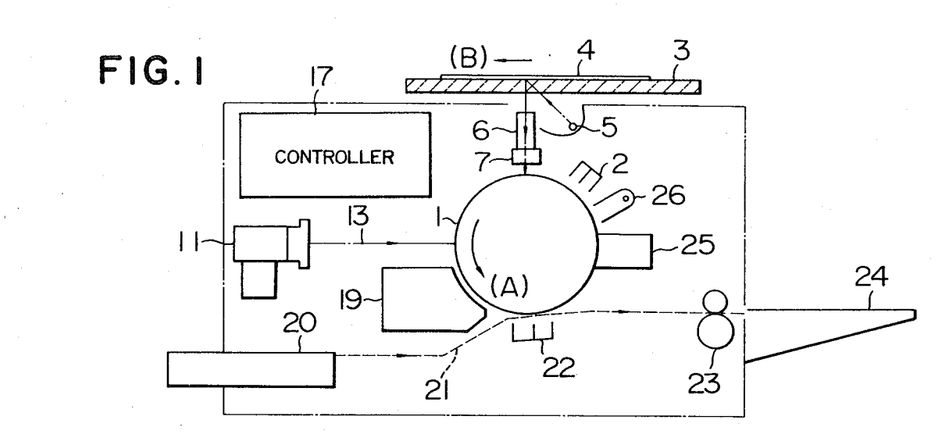
FIG. 1 is a vertical cross-sectional view of the electrophotographic printer of the moving text type according to the present invention.
Figure 2:
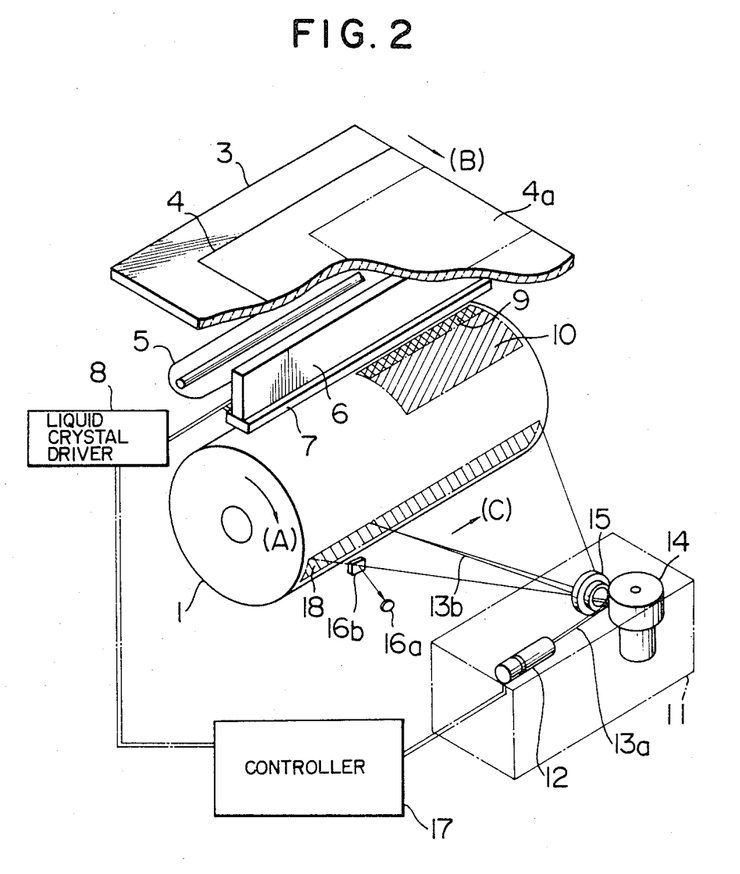
FIG. 2 is a partial perspective view of the printer shown in FIG. 1.
Figure 3:
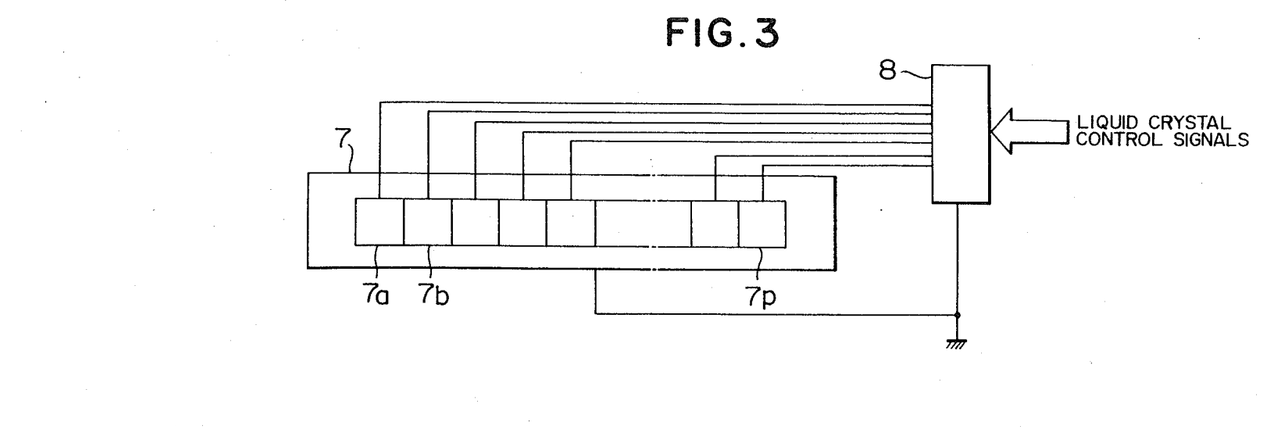
FIG. 3 is a block diagram showing the liquid crystal switch of the copying exposure system.

The illustrated embodiments of the present invention will now be described in detail. In FIGS. 1 and 2, a drum of photosensitive recording medium 1 is rotated at a constant speed in the direction shown by the arrow A, and its exterior surface is charged uniformly by a charging device 2. A text table 3 is moved in the direction shown by the arrow B at a speed equal to the peripheral speed of the drum 1. While the text table is moving, a copy text 4 placed down-face on the text table 3 reflects the light from an illumination lamp 5 to the drum 1 through a rod lens array 6 and electrically controlled optical switch 7 so as to perform copying exposure. As shown in FIG. 3, the optical switch 7 is an array of 16 liquid crystal switch elements 7a–7p aligning along the axial direction of the drum 1, and some of the switch elements corresponding to areas to be exposed are made photo-conductive selectively by a liquid crystal driver 8. If, for example, an area referred to by 4a on the text 4 is to be copied, only elements of the optical switch 7 corresponding to that area become photo-conductive to provide a copying exposure area 9 on the drum. As the text 4 is scanned and the drum 1 rotates, the first positive electrostatic latent image 10 for the copying image area 4a is formed in the printing medium on the drum 1. Elements of the optical switch 7 corresponding to the remaining portion of the text 4 are kept photointerruptive, and that portion of the drum surface is not exposed to the light.

A laser beam scanner 11 is a device to perform printing exposure in which a laser beam 13a is produced by a laser beam generator 12 consisting of a semiconductor laser and a coupling lens, and it is transformed into a deflection laser beam 13b by a rotating polygomirror 14 and then focused by an F-θ lens 15 to form a scanning laser spot on the drum surface 1. The F-θ lens is designed so that the laser spot travels on the drum surface at a constant scanning speed. The laser beam scans the drum surface along the axial direction shown by the arrow C on a scanning plane 90 degrees apart from the position of the above-mentioned copying exposure. When the laser beam comes to a position immediately before the scanning start position, a beam detector 16a senses a laser beam reflected by a mirror 16b and produces a scanning reference position signal. In synchronization with the reference position signal, the scanning laser beam is subjected to intensity modulation in accordance with the print image information signal supplied from a controller 17. As the drum 1 rotates, a printing image is irradiated to the drum surface, and the second positive electrostatic latent image 18 is formed. In order that both the first latent image (copying image) 10 and the second latent image (printing image) 18 are composed on the drum surface without interference with each other, a laser drive circuit 31 controls the laser beam so that printing exposure takes place to the exclusion of the first electrostatic latent image 10. These two electrostatic latent images 10 and 18 are subjected to positive development by a developer 19 and turned into a toner image. A piece of recording paper fed from a paper cassette 20 comes into contact with the drum surface 1 while it is transported through a paper path 21, and at the contact section the toner image on the drum surface 1 is transferred to the paper by the action of a transferring device 22. The printing paper is further transported through a fixing device 23 so that the toner image is fixed, and then the printed paper is delivered to a stacker 24. After the transfer of the toner image, residual toner on the drum surface 1 is removed by a cleaner 25 and residual charges are neutralized by a discharging device 26, and then the clean drum 1 is ready for use in the subsequent electrophotographic process.

Figure 4:
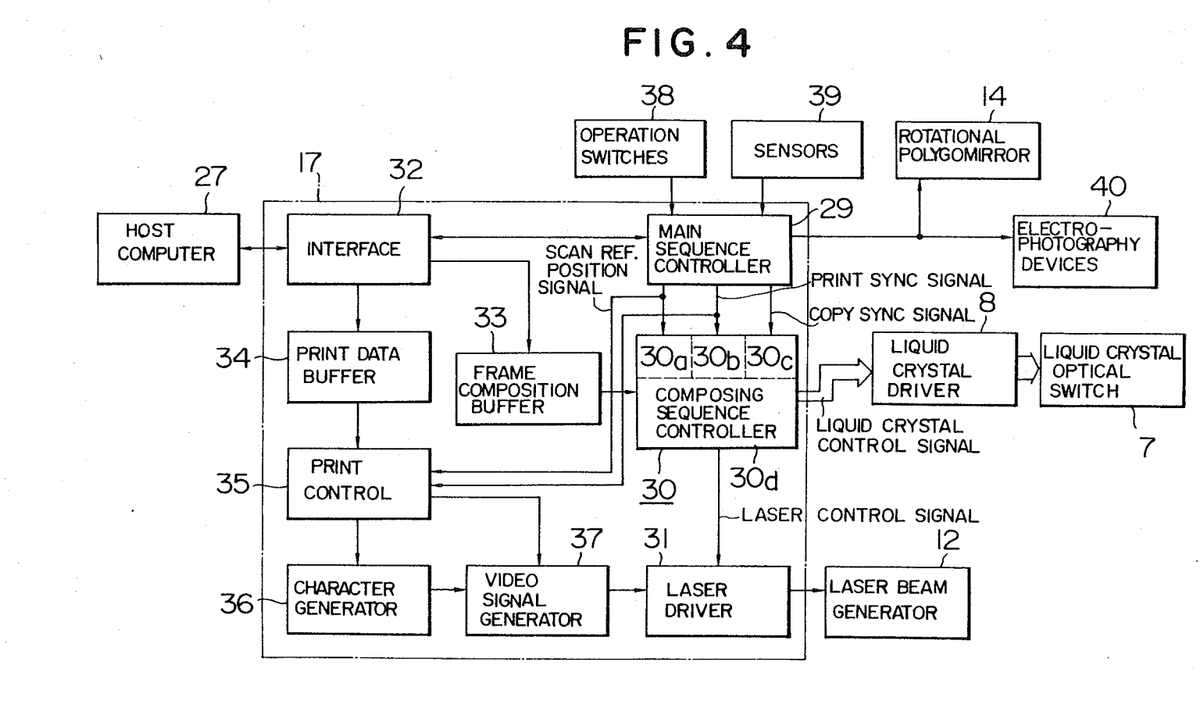
FIG. 4 is a block diagram showing the control circuit for the copying exposure system and printing exposure system.
Figure 5:
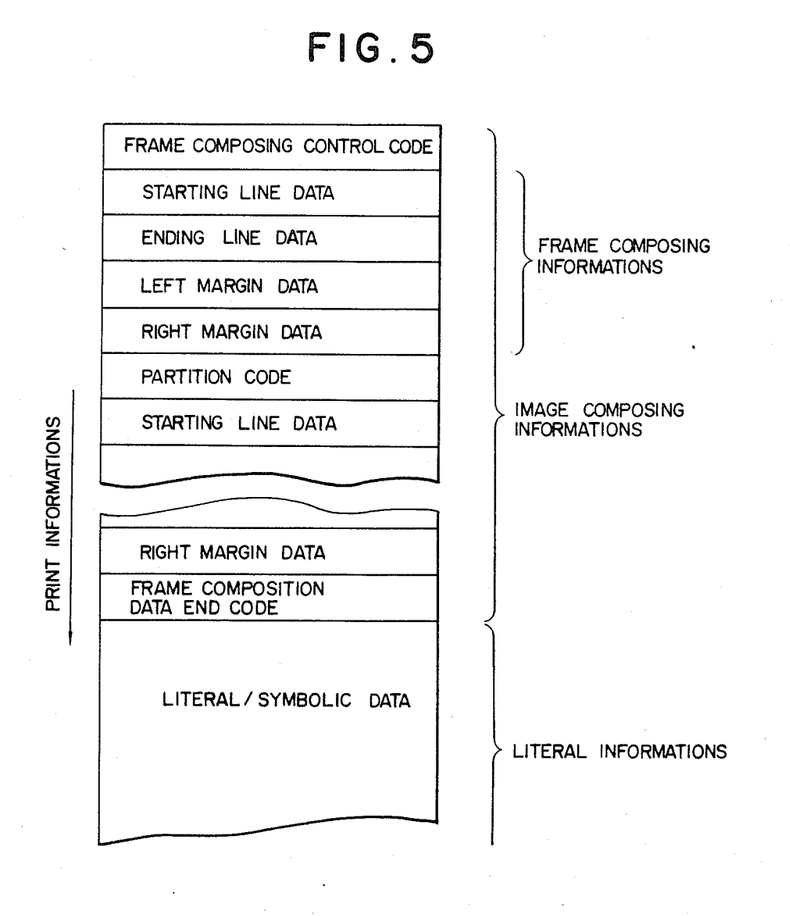
FIG. 5 is a diagram showing the arrangement of print information.

FIG. 4 is a general block diagram of the control circuit. In the figure, reference number 27 denotes a host computer and 17 denotes a controller provided within the electrophotographic printer. The controller 17 includes a main sequence controller 29, a composing sequence controller 30, a laser drive circuit 31, an interface circuit 32, a frame composition buffer 33, a print data buffer 34, a print control circuit 35, a character generator 36, and a video signal generator 37. The main sequence controller 29 receives print information from the host computer 27 through the interface circuit 32 in response to the command signal from operation switches 38 and signals from sensors 39, and controls the rotation of the polygomirror 14 and the operation of electrophotography devices 40. The main controller 29 provides the copy sync signal and print sync signal for the composing sequence controller 30, produces the scanning reference position signal based on the scanning position signal from the beam detector 16a, and sends the print sync signal and scanning reference position signal to the print control circuit 35. Print information falls into frame composing information and literal information as shown in FIG. 5, the former being stored in the frame composition buffer 33 and the latter in the print data buffer 34.

The main sequence controller 29 recognizes the arrival of the recording start position of the drum 1, which has been charged by the charging device 2, at the copying exposure position, i.e., the position beneath the optical switch 7, based on the count of clock pulses, and generates a copy sync signal at this moment. The main sequence controller 29 also recognizes that the recording start position confronts the printing exposure position, i.e., the direction of the laser beam 13, and produces the print sync signal. The print sync signal is generated with a time lag of $T_o$ from the copy sync signal, and the time difference $T_o$ is preset in relation to the peripheral speed of the drum 1 and the distance between the two exposure positions.

The composing sequence controller 30 receives the scanning reference position signal, copy sync signal and print sync signal at its sections 30a, 30b and 30c, respectively, starts to count clock pulses at this time point, and then provides for the main section 30d of the composing sequence controller information on the positional relations between the drum 1 and optical switch 7, and between the drum 1 and laser beam. The main section 30d compares the positional information from the section 30c with the frame composing information from the frame composition buffer 33, and produces the liquid crystal control signal for making the optical switch 7 photo-conductive or photo-interruptive. The main section 30d further provides the laser control signal for the laser drive circuit 31 based on the positional information from the sections 30a and 30b and frame composing information from the frame composition buffer 33, so as to control the laser output from the laser beam generator 12 in a ON/OFF fashion.

Figure 6:
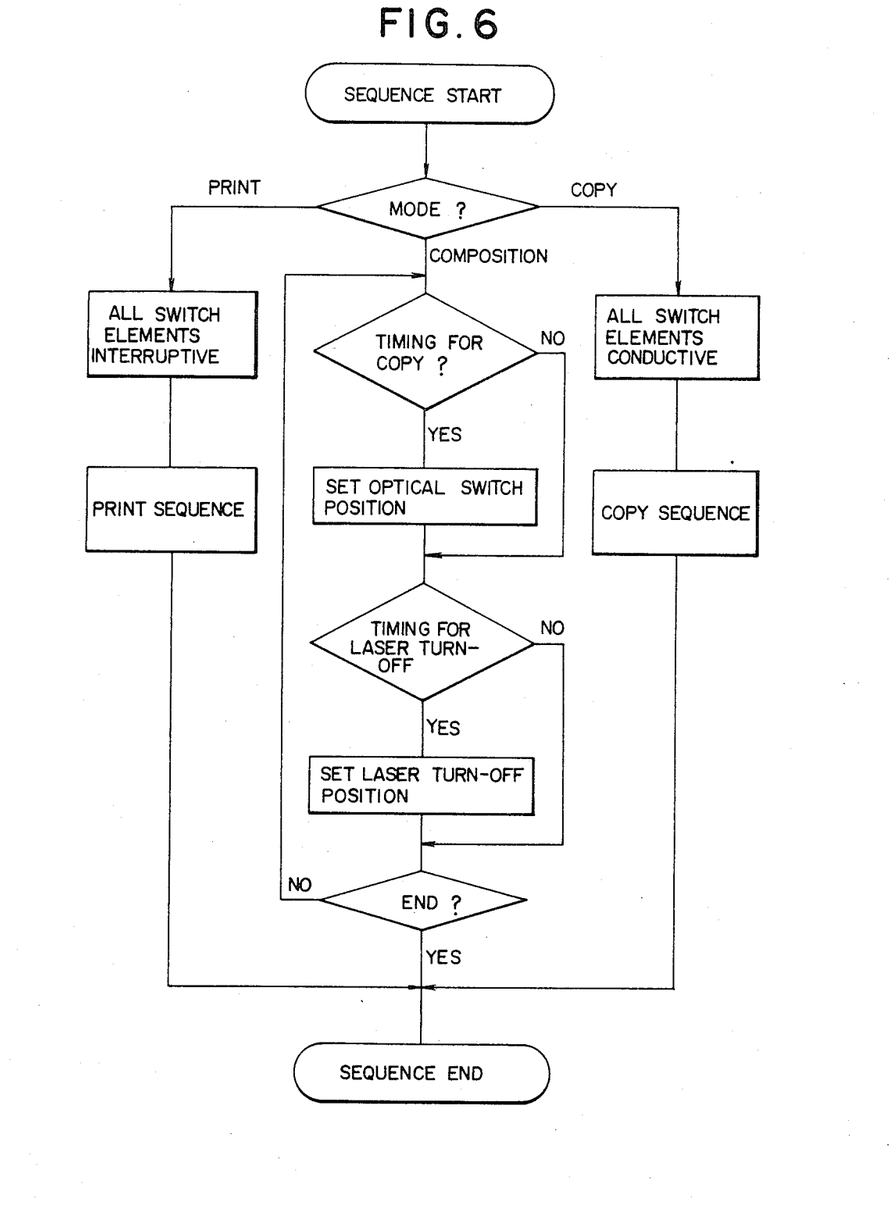
FIG. 6 is a flowchart showing the control operation of the composition sequence controller.

In the case of producing a sole copy, all elements 7a–7p of the optical switch are made photo-conductive throughout the printing period, while the laser drive circuit 31 and laser beam generator 12 quit their operations throughout the period. In the case of producing a sole character print, all elements 7a–7p of the optical switch are made photo-interruptive throughout the printing period, while the laser drive circuit 31 is active throughout the period to drive the laser beam generator 12. In the case of producing a compound print of a copied and printed character images, only optical switch elements confronting the copying image area are made photo-conductive, and the laser beam generator 12 is controlled to quit the laser generation when it confronts the copying image area. This image composing control may be made such that optical switch elements confronting portions other than the printing image area are made photo-conductive, with the laser beam generator 12 being deactivated when it confronts portions other than the printing image area. FIG. 6 shows in a flow diagram the operation of the foregoing sequence control.

The print control circuit 35 reads out literal information to be printed from the print data buffer 34 in response to the print sync signal and scanning reference position signal provided by the main sequence controller 29, and it is transformed into a video signal by the character generator 36 and video signal generating circuit 37. If the laser drive circuit 31 is active, the laser beam generator 12 is controlled based on the video signal so that the laser output power is controlled. Through the control of the laser power, the laser beam spot formed on the drum surface 1 is subjected to intensity modulation.

Figure 7:
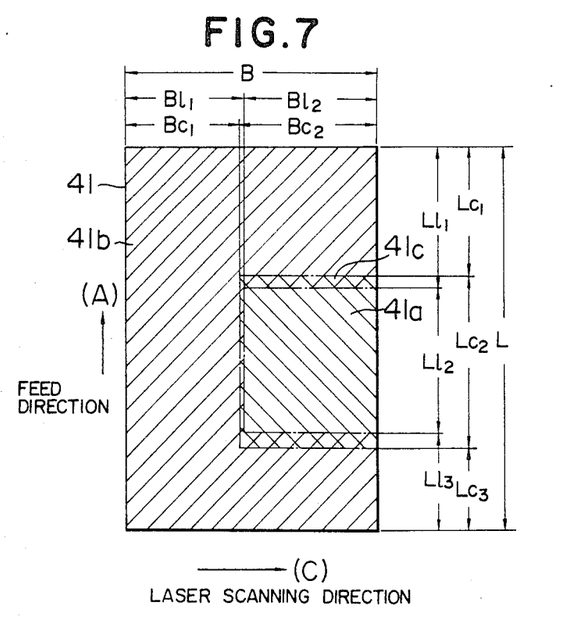
FIG. 7 is an illustration showing an example of compound frame made up of a copying image and printing image.

The operation of producing a print of compound images as shown in FIG. 7 will be described in more detail with reference to FIGS. 8, 9 and 10. In FIG. 7, the area (B×L) referred to by 41 is the whole area of the printing paper, the area ($B_{l2} \times L_{l2}$) referred to by 41a is the copying image area, the area $(B \times L)-(B_{c2} \times L_{c2})$ referred to by 41b is the printing image area, and the area $(B_{c2} \times L_{c2})-(B_{l2} \times L_{l2})$ referred to by 41c is the boundary area.

Figure 8:
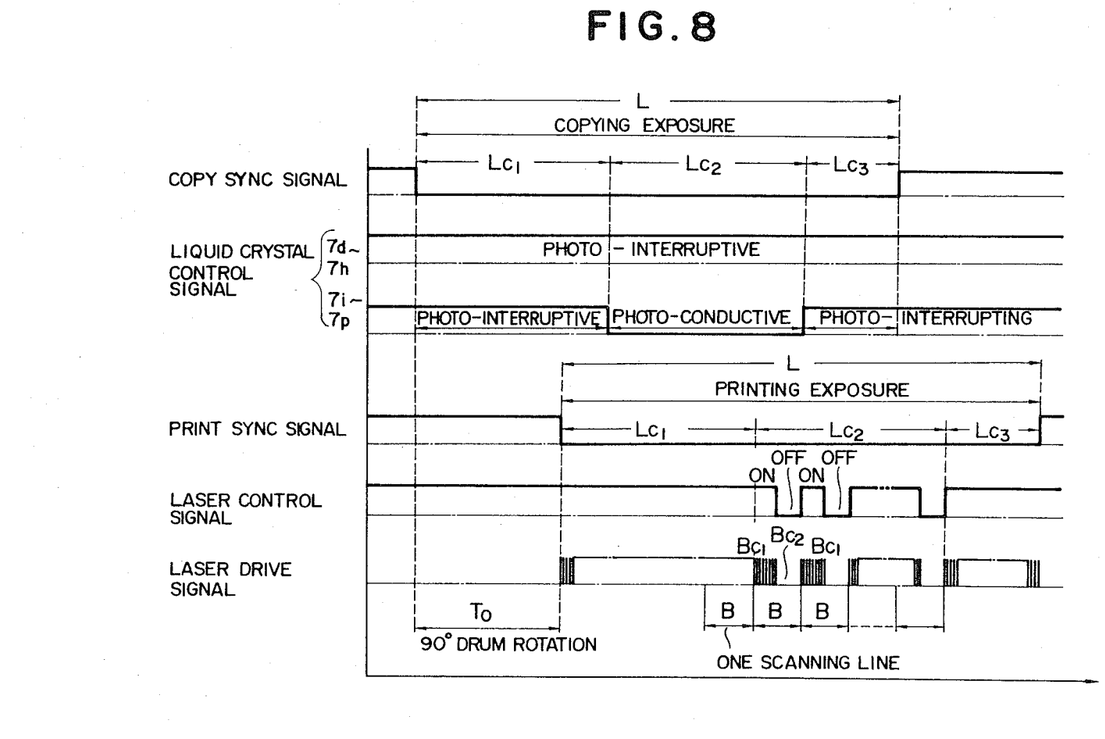
FIG. 8 is a timing chart showing the operation of copying exposure and printing exposure.
Figure 9:
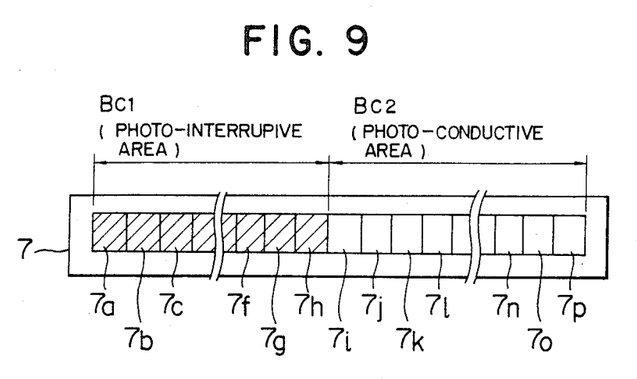
FIG. 9 is a diagram showing the operation of the liquid crystal optical switch.
Figure 10:
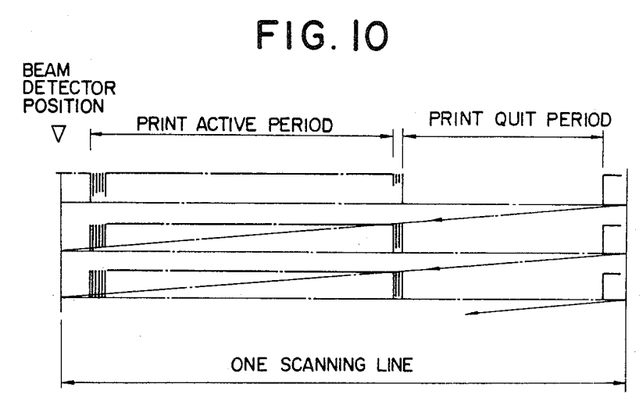
FIG. 10 is a timing chart of the laser drive signal in the operation of the optical switch shown in FIG. 9.

FIG. 8 is a timing chart of the operation for producing the print shown in FIG. 7, FIG. 9 is a diagram illustrating the operation of the liquid crystal optical switch elements 7a–7p, and FIG. 10 is a timing chart for the laser drive signal.

First, the copy text 4 is placed on the text table 3 and the operation switches 38 are operated to start the main sequence controller 29. Print information is supplied from the host computer 27, frame composing information is stored in the frame composition buffer 33, literal information is stored in the print data buffer 34, the polygon mirror 14 and electrophotography devices 40 are activated, and thus the system is ready for printing. In the frame composing information shown in FIG. 5, data on the starting line corresponds to $L_{c1}$ of FIG. 7, data on the last line to $L_{c1}+L_{c2}$, data for the left-hand marginal position to $B_{c1}$, and data for the right-hand marginal position to $B_{c1}+B_{c2}$, respectively. The text table 3 starts moving, and when the top of the text reaches the copying exposure position on the drum 1, the main sequence controller 29 issues a copy sync signal to the section 30c of the composing sequence controller 30. The section 30c transfers information on the positional relation between the drum 1 and optical switch 7 to the main section 30d, which further receives information on frame composition from the frame composition buffer 33.

The composing sequence controller 30 provides the liquid crystal control signal for making photo-interruptive the optical switch elements 7a–7p for the entire scanning range B during the period for the feed distance $L_{c1}$. The controller 30 provides the liquid crystal control signal for making photo-conductive the optical switch elements for scanning range $B_{c2}$ in the period for the feed distance $L_{c2}$ (in this embodiment, it is assumed that the scanning range $B_{c1}$ is covered by optical switch elements 7a–7h, and the range $B_{c2}$ is covered by elements 7i–7p). FIG. 9a shows the state of the optical switch 7 at this time. The controller 30 further provides the liquid crystal control signal for making photo-interruptive the all optical switch elements 7a–7p for the entire scanning range B during the period for the feed distance $L_{c3}$. Through these operations copying exposure is operated on the copying image area 41a and the first electrostatic latent image is formed on the drum surface 1.

On the other hand, when the position on the drum 1 corresponding to the text top reaches the laser printing exposure position on expiration of $T_o$ following the copy sync signal, the main sequence controller 29 issues the print sync signal and scanning reference position signal. The print control circuit 35 reads out literal information from the print data buffer 34 and transforms the information into dot data in cooperation with the character generator 36. The dot data is formed into the video signal to be carried by the scanning laser beam by the video signal generating circuit 37, and then fed through the laser drive circuit 31 to the laser beam generator 12 as a laser drive signal. The video signal includes literal information during the scanning period for the printing image area 41b, but carries no information for the boundary area 41c and copying image area 41a. The composing sequence controller 30 provides the laser control signal for deactivating the laser drive circuit 31 so that the laser drive signal is not produced during the period in which the laser beam scans the copying image area 41a. Accordingly, the laser beam is extinguished during the period of the copying image area 41a, and the copying electrostatic latent image is protected from destruction by dual exposure. FIG. 10 shows the laser drive signal in this operation.

The boundary area 41c in the frame is the exposure lacking area created when the optical switch 7 makes a transition from the photo-interruptive to conductive state or from photo-conductive to interruptive state. This area 41c is subjected to additional exposure by the non-modulated laser beam when it comes to the printing exposure position so that residual charges due to lacking exposure are eliminated thereby to avoid toner. The boundary area 41c takes a width of 1 to 2 lines of printing image (more than 50 laser scanning lines). This control is carried out by the composing sequence controller 30 in accordance with image composing information stored in the frame composition buffer 33 and the print sync signal, copy sync signal and scanning reference position signal provided by the main sequence controller 29.

Figure 11:
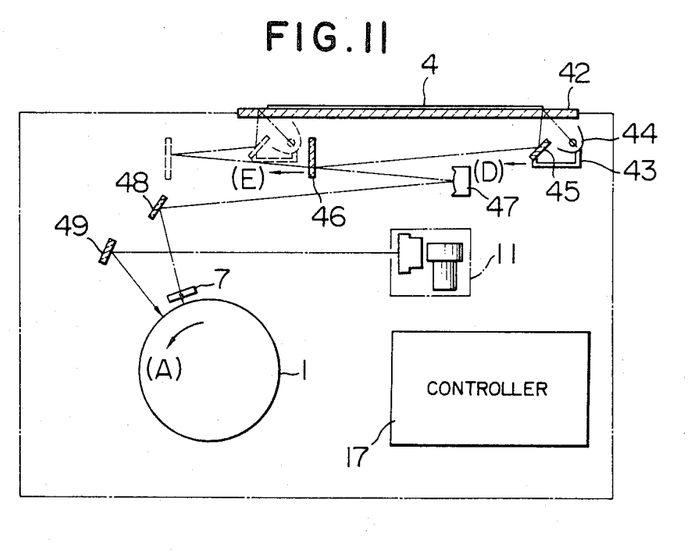
FIG. 11 is a vertical cross-sectional view of the electrophotographic printer of the stationary text type according to the present invention.

FIG. 11 is a vertical cross-sectional view showing briefly the total structure of the printer of the stationary text type. The arrangement includes a text table 42 for placing a copy text 4, a carriage 43 for moving an illumination lamp 44 and reflector 45 in the direction shown by the arrow D, a reflector 46 which moves in the direction shown by the arrow E at a speed half that of the carriage 43, a fixed copying lens 47, and a fixed reflector 48. The light reflected on the text 4 is conducted via the reflectors 45, 46 and 48 and the copying lens 47, and then irradiated through a liquid crystal optical switch 7 on to the drum surface 1, so that copying exposure takes place as in the case of the previous embodiment. The laser beam produced in a laser beam scanning means 11 is projected via a reflector 49 on to the drum surface 1, so that printing exposure takes place. The operations of charging, development, image transfer, cleaning, and discharging for the drum 1, and paper feed, fixing process and control of the controller are identical to those of the previous embodiment, and explanation thereof is omitted.

According to the present invention, as described above, the copying exposure system is provided with an electrically controlled optical switch, which is controlled in accordance with information on image composing positions and information on the positional relation between the exposure means and printing medium so that printing exposure areas are not subjected to copying exposure, whereby compound images can be produced on the printing medium without the need of modification for the copy text, and in addition, a print of sole copied image or a print of sole printed character image can conveniently be produced.

We claim:

1. An electrophotographic printer for producing a print of compound copied and printed character images by carrying out electrophotographic processes including charging, exposure, positive development and fixing sequentially for a photosensitive printing medium, said printer comprising:
   electrophotographic processing means for performing said electrophotographic processes;
   an electrically controlled optical switch which controls exposure of said photosensitive printing medium by selectively conducting or interrupting an image of a copy text placed on a text table:

laser beam scanning means for scanning a laser beam in a predetermined direction on said photosensitive printing medium to expose said printing image thereon;

print information storage means for receiving and storing external literal information to be printed;

printing exposure control means for generating signals and for modulating the laser intensity of said laser beam scanning means in accordance with literal information stored in said print information storage means;

frame composing information storage means for receiving and storing external frame composing information for said copying image and printing image;

process sequence control means for controlling the operation of said electrophotographic processing means, and providing positional synchronizing signals when said photosensitive printing medium has predetermined positional relations with said electrically controlled switch and said laser beam scanning means;

positional information means for receiving said positional synchronzing signals and providing positional information on the positional relations between said photosensitive printing medium and said electrically controlled optical switch and between said medium and said laser beam scanning means; and frame composing control means for receiving said frame composing information and said positional information and controlling said electrically controlled optical switch and said printing exposure control means in accordance with said information for enabling exposure of compound copied and printed character images on said photosensitive printing medium in the predetermined direction of laser beam scanning.

2. An electrophotographic printer according to claim 1, wherein said photosensitive printing medium is formed on a drum surface, said laser beam scanning means operates on said printing medium to be exposed to said printing image by scanning the drum surface with a laser beam along the axial direction of the drum as the predetermined direction of laser beam scanning, and said electrically controlled optical switch is made up of a plurality of optical switch elements aligning along the axial direction of the drum.

3. An electrophotographic printer according to claim 1, wherein said printing exposure control means comprises a print control circuit which reads out literal information from said print information storage means in accordance with positional information from said positional information means, a character generator which transforms an output signal from said print control circuit into a dot signal, a video signal generating circuit which transforms the dot signal from said character generator into a video signal in correspondence to scanning positions of said laser beam, and a laser drive circuit which drives said laser beam scanning means in accordance with the video signal.

4. An electrophotographic printer according to claim 3, wherein said laser drive circuit provides an ON/OFF controlled output in accordance with a control signal from said frame composing control means.

5. An electrophotographic printer according to claim 1, wherein said frame composing control means further enables exposure of compound copied and printed character images on said photosensitive printing medium in a direction transverse to the predetermined direction of laser beam scanning.

6. An electrophotographic printer according to claim 5, wherein said photosensitive printing medium is selectively divided into a plurality of areas to be exposed in at least one of the predetermined direction of laser beam scanning and a transverse direction thereto, and said frame composing control means enables exposures of one of copied and printed character images in respective ones of said plurality of areas of said photosensitive printing medium.

7. An electrophotographic printer according to claim 6, wherein said photosensitive printing medium is selectively divided into a plurality of areas to be exposed at least in the predetermined direction of laser beam scanning.

8. An electrophotographic printer according to claim 1, wherein said frame composing control means includes means for discharging residual charges on said photosensitive printing medium in a boundary portion of said compound copied and printed character images on said photosensitive printing medium by exposing said boundary portion by said laser beam.

9. An electrophotographic printer according to claim 1, wherein said positional synchronizing signals provided by said process sequence control means include a scanning reference position signal indicative of a reference position of laser beam scanning, a copy sychronizing signal indicative of a start position for a copying operation, and a print synchronizing signal indicative of a start position of a printing operation, said printing exposure control means generating a video signal by reading out said literal information stored in said print information storage means in response to said print synchronizing signal and said scanning reference position signal and for modulating the laser intensity of said laser beam scanning means in accordance with said read-out literal information.

10. An electrophotographic printer according to claim 9, wherein a surface of said photosensitive printing medium is selectively divided into a plurality of areas to be exposed in the predetermined direction of laser beam scanning and said frame composing control means enables exposure of one of the copied images and printed character images in respective ones of said plurality of areas.

11. An electrophotographic printer according to claim 10, wherein said frame composing control means includes means for discharging residual charges on said photosensitive printing medium in a boundary portion of said compound copied and printed character images on said photosensitive printing medium by exposing said boundary portion by said laser beam.

* * * * *